Figure 1:
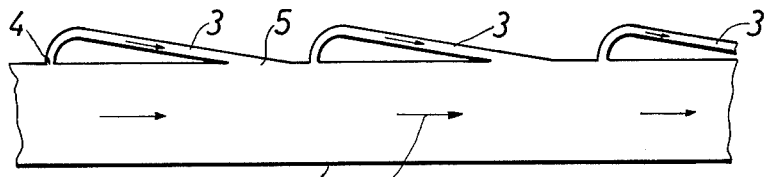

INVENTORS:
AXEL LIPPERT, EDGAR MUSCHELKNAUTZ.
ATTORNEYS

United States Patent Office 3,240,531
Patented Mar. 15, 1966

3,240,531
PROCESS FOR AUTOMATICALLY SEPARATING A COLUMN OF GRANULAR OR PULVERULENT MATERIAL
Axel Lippert, Leverkusen, and Edgar Muschelknautz, Leverkusen-Bayerwerk, Germany, assignors to Farbenfabriken Bayer Aktiengesellschaft, Leverkusen, Germany, a German corporation
Filed Mar. 17, 1964, Ser. No. 352,554
Claims priority, application Germany, Mar. 19, 1963, F 39,284
4 Claims. (Cl. 302—24)

The invention relates to a process by which a column of granular or pulverulent material, which is conveyed by pneumatic or hydraulic means through a pipe conduit, is separated automatically into short plugs of material, all of which are of practically the same length.

It is known to produce plugs of a certain length from plastic caking compositions by means of a piston press located outside the conduit, to pass these plugs successively into a conveyor conduit and to convey them through the conduit by means of compressed air.

Pulverulent or granular material cannot be conveyed in this manner, since the individual plugs formed outside the conveyor conduit automatically disintegrate once inside the conduit. After a short distance, they are pushed together to form a long column of material which clogs the conduit and which can only be pushed forward by means of a disproportionately, and thus uneconomically, high pressure of the conveying medium.

In order to overcome this defect when conveying pulverulent or granular material, the principle of the efforts that have hitherto been made to prevent the formation of cakes or stoppages in the conduit, has been to loosen them by means of compressed air. In order to reduce the wear on a conveyor conduit, it has been proposed that a cushion should be formed by injection of pressure medium between the wall of the conduit and the flow of material at those parts of the conduit which are critical, the pressure medium applied to these parts being branched off from the main stream of pressure medium. The material is loosened at these places, but once it has travelled a short distance in the conduit, it is again compressed into a long column of material if it is not constantly maintained in a flowing condition.

It has now been found that granular or pulverulent material can be conveyed without danger of clogging, and at a fraction of the hitherto usual throughputs and velocities of the conveyor medium, if the main stream forming the material-conveying mixture in the pipe conduit is partially branched off according to the invention, parallel to the flow, at a plurality of positions which follow one another at small intervals, and the component stream flowing through each branch separately from the main stream is again conducted into the main stream just before the next branch position, along the direction of flow. The effect achieved by this is that the long columns of material, which are always formed in the conveyor conduit when there is very heavy loading of the mainstream, e.g. at approximately 100 to 300 kg./h. of material per kg./h. of gas and at very small conveying velocities, e.g. at 1 to 3 m./sec., are automatically split up at the spacings of the branch positions, which are equal to one another, into plugs which therefore have practically the same length as one another. The length of a plug depends upon the length of the branch. These lengths must not be below a certain value, since otherwise the plugs disintegrate. The spacing between the inlet and outlet openings of the branches should be 5 to 15 times greater than the internal diameter of the conveyor conduit.

The short plugs which are automatically formed in this way during the conveying operation are maintained during this operation, or are always reformed if a few short plugs should partially or completely break up during the conveying action and the following plugs should run on to the heaps left in the pipe, thus forming a long column of material. When the length of the column of material in the pipe exceeds the length of two successive branches, the front end of the column automatically separates.

The conveying of the short plugs of material remains steady, even at the lowest possible conveying speed.

An apparatus for carrying out the process comprises a conveyor pipe conduit with branch conduits which are parallel to the pipe and each of whose ends opens into the conveyor pipe. According to the invention, many short branch conduits are arranged one after the other longitudinally of the pipe conduit, the outlet opening of each branch conduit being closed before the inlet opening of the next branch conduit. The branch conduits are advantageously formed of a pipe which is arranged inside the conveyor conduit and which is cranked at intervals, the pipe being cut away at the crank positions.

Embodiments of the apparatus are shown diagrammatically and in longitudinal section in the drawing.

Figure 2:
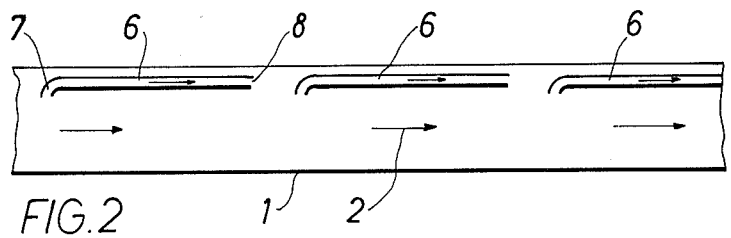
Figure 3:
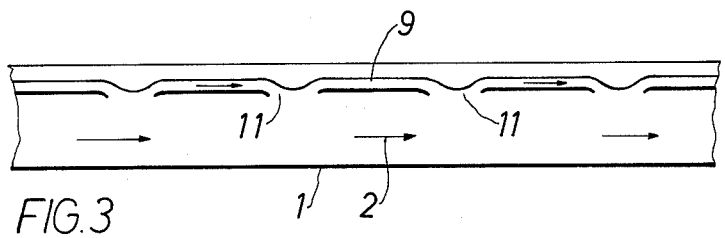
Figure 4:
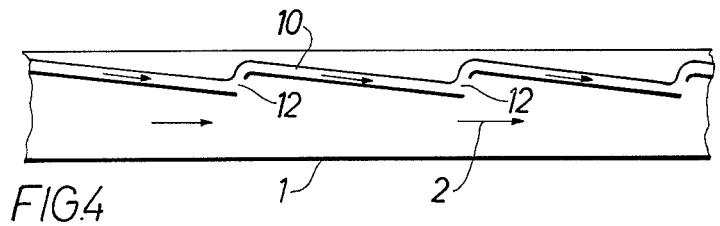
Figure 5:
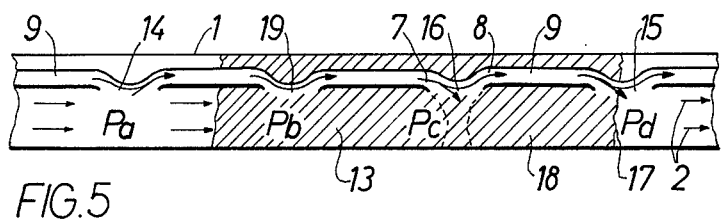
Figure 6:
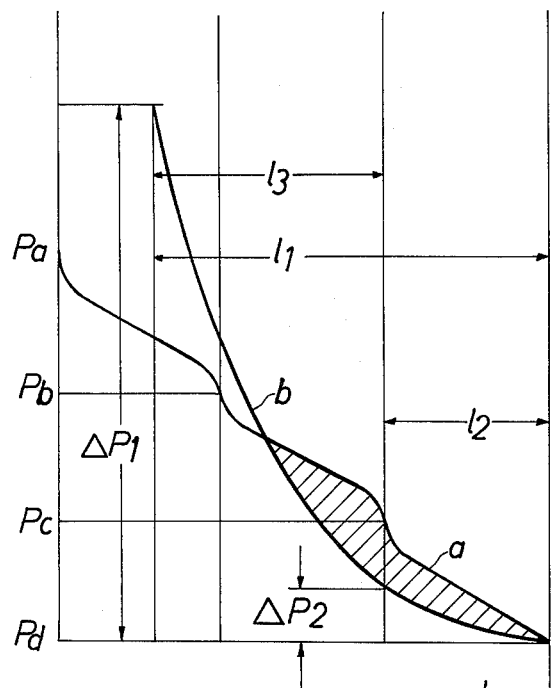

FIGURE 1 shows a conveyor pipe with individual external branch pipes connected to it; FIGURE 2 shows a conveyor pipe having separate internal branch pipes; FIGURES 3 and 4 each illustrate a pipe having, extending through it, an internal branch pipe cranked at intervals and with openings into the main pipe. FIGURE 5 shows the main pipe according to FIGURE 3, with a plug of excessive length disposed in it, the front end of this plug being in the course of being separated at a branch position (shown in broken lines). FIGURE 6 shows, by means of a graph, the variation in static pressure along the conveyor pipe of FIGURE 5 in the plug (curve $b$) and in the continuous branch pipe (curve $a$).

In detail, FIGURES 1 to 5 show the conveyor pipe at 1 and the conveying direction at 2. According to FIGURE 1, the branch pipes 3 are arranged externally on the pipe 1, the two ends opening at and 5 into the pipe 1. In the pipe according to FIGURE 2, branch pipes are arranged in a row one after the other near the wall. Each branch pipe has openings 7 and 8. In the continuous branch pipes 9 and 10 of FIGURES 3 and 4, the branch openings 11 and 12 arranged at intervals are formed by the pipes being cranked at these positions, the openings 11 (FIGURE 3) being cut away rectilinearly and the openings 12 (FIGURE 4) being cut away obliquely. The effect of this is that any dust particles which may be entrained in the branch pipe are projected out at the openings 11 or 12.

FIGURE 5 explains how a plug of material which is of excessive length is split up into shorter plugs.

The curve $b$ in FIGURE 6 indicates the minimum pressure differences required for conveying plugs of length $l$. The expression "pressure difference" means the difference in the static pressures of the conveying medium ahead of and behind the plug 13. The minimum pressure difference increases progressively with increasing plug length, because of wedging effects of the dust particles against one another and against the wall. The pressure difference $\Delta P_1$ is required for conveying the over-long plug 13 having the length $l_1$, which has for example stuck in the pipe 1. There is, however, only available a pressure difference $P_a - P_d$, such as obtains for example between the pipe branch positions 14 and 15. This pressure difference is smaller than $\Delta P_1$ and consequently is insufficient for moving the plug 13. Consequently, at the pipe branch position 16, the static pressure $P_c$ which obtains at this point, presses on the plug 13. The pressure $P_c$, together with the static pressure $P_d$, obtaining at the forward end 17 of the plug 13, produces the pressure difference $P_c - P_d$, which is larger than the pressure difference $\Delta P_2$ (FIGURE 6), which is necessary for advancing the forward section of the plug which is disposed between the points 15 and 16. Consequently, the plug is split off (as shown in broken lines) by the component stream rushing out of the opening of the branch position 16, so that a plug section 18, of length $l_2$, is formed. The point at which the plug is split (shown in broken lines) and corresponding to the branch position 16 is filled with air from the branch pipe 9 and the plug section 18 is pushed forward through the pipe 1.

The remainder of the original plug 13, of length $l_3$, which is still stuck in the pipe, is split in similar manner at the branch position 19. The three sections of the original plug 13 which are thus formed continue to travel one after the other at small intervals through the pipe 1. When plug sections of length corresponding to the intervals of the branch positions travel past one of the latter, the pressure and quantity of the component stream flowing through the branch pipe are not sufficient to split the plug section. They only become sufficient if the plug sections should remain stationary at this point, consequently forcing the entire stream of conveying medium to pass suddenly through the branch pipe. Any clogging in the pipe 1 is thus eliminated automatically as soon as it forms.

There is no danger of the branch pipe becoming clogged, since comparatively high velocities obtain in this pipe and the boundary layer on its wall is very thin because of the small diameter.

The favourable spacings of the openings of the branch pipes at the branch positions are practically only dependent upon the diameter of the main conveyor conduit 1. They depend only to a very small degree on the nature of the dust. The pressure drop in the conveyor conduit 1, which is required for conveying short plugs, is substantially smaller with small air quantities than with the unsteady conveying of balls and strands in the conventional conveyor conduits, because practically all the conveyor medium is utilised for conveying the short plugs. With balls and strands, however, most of the conveying medium flows past these latter and the pressure losses caused by eddying and wall friction contribute nothing to the conveying action.

Another advantage of the new process is that it is usually possible with pneumatic conveyor installations of this type to dispense with cyclone separators at the end of the conveyor conduit, because the material being conveyed can be allowed to fall, without heavy dust formation, slowly from the conduit directly into a bunker.

Furthermore, because of the low velocities of the material, the wear on the pipe conduit is far less than with the methods previously used for conveying purposes. It is an additional advantage that electrostatic charging is practically avoided.

Since the conveying of the plugs involves almost a pumping flow which, in addition, is effected at a slow velocity, the principle can also be utilised for processes involving heat transfer and material exchange and as a reaction tube.

We claim:

1. A process by which a column of pulverulent material which is conveyed by pressure means through a pipe conduit is automatically separated into short plugs of material having almost the same length, wherein the main stream forming the material-conveying mixture in the pipe conduit is partially branched off parallel to the flow at a plurality of positions following one another at small intervals and the component stream flowing through the branch concerned, separately from the main stream, is conducted into the main stream again just before the next branch position, seen in the direction of flow.

2. An apparatus for carrying out the process as claimed in claim 1, comprising a conveyor pipe conduit having branch pipes which are parallel to the conduit and which open at both ends into the conveyor pipe, wherein a plurality of short branch pipes are arranged one after the other longitudinally of the pipe conduit, the outlet opening of each branch pipe opening just before the inlet opening of the next branch pipe, seen in the direction of flow.

3. An apparatus as claimed in claim 2, wherein the distance between inlet and outlet openings of the branch pipe is 5 to 15 times greater than the internal diameter of the conveyor pipe conduit.

4. An apparatus as claimed in claim 2, wherein the branch pipes are formed of a pipe which is arranged inside the conveyor pipe conduit and which is cranked at intervals, being cut away at the cranked positions.

References Cited by the Examiner

UNITED STATES PATENTS

| 149,114 | 3/1874 | Grieser | 302—24 |
| 475,635 | 5/1892 | Taylor | 302—24 |
| 494,274 | 3/1893 | Kelley | 302—62 |

FOREIGN PATENTS 598,363  6/1934  Germany.

SAMUEL F. COLEMAN, *Primary Examiner.*